No. 793,799. PATENTED JULY 4, 1905.
T. C. NELSON.
TRUCK.
APPLICATION FILED SEPT. 29, 1904.
2 SHEETS—SHEET 1.
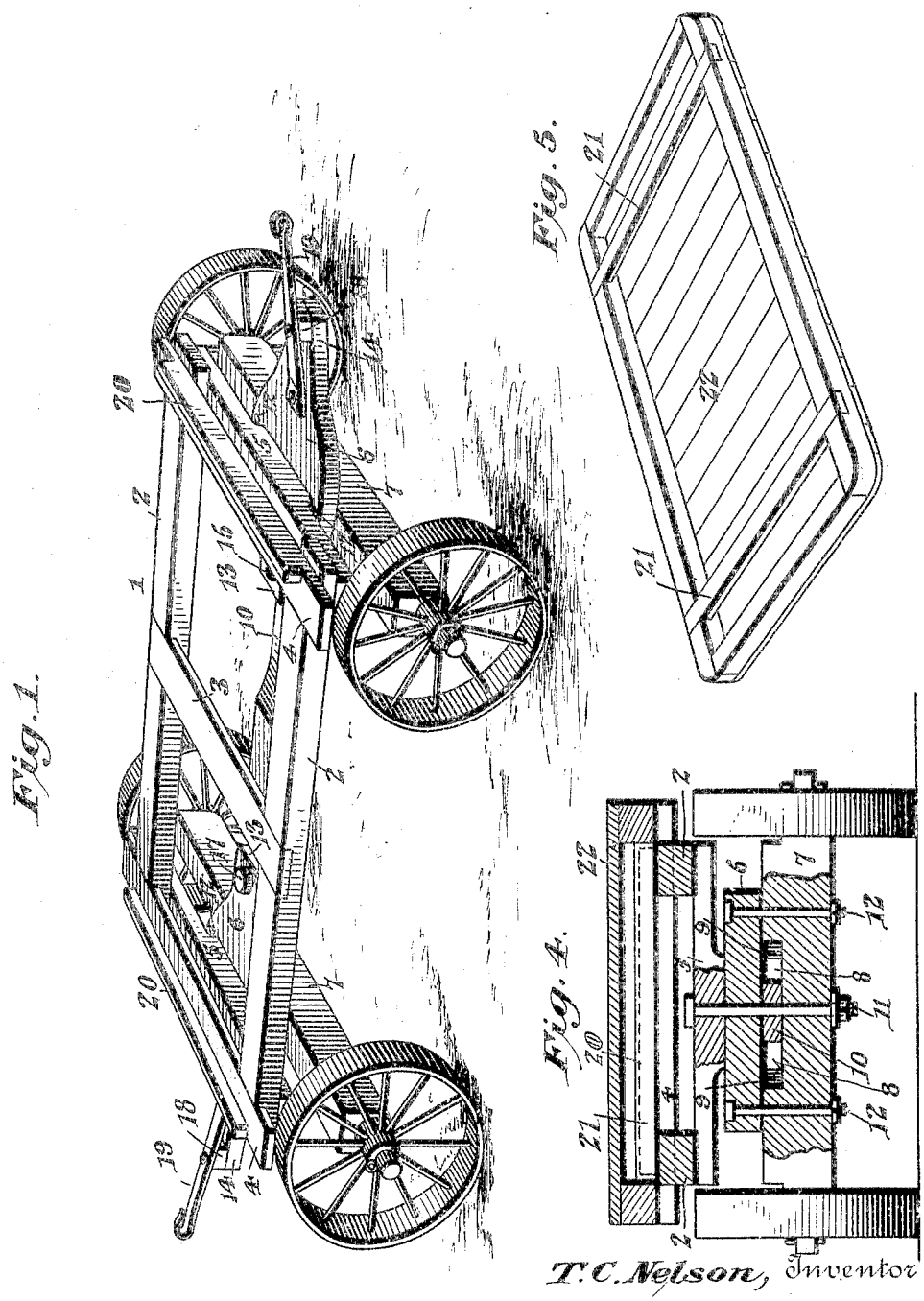
T. C. Nelson, Inventor
Witnesses No. 793,799. PATENTED JULY 4, 1905.
T. C. NELSON.
TRUCK.
APPLICATION FILED SEPT. 29, 1904.
2 SHEETS—SHEET 2.
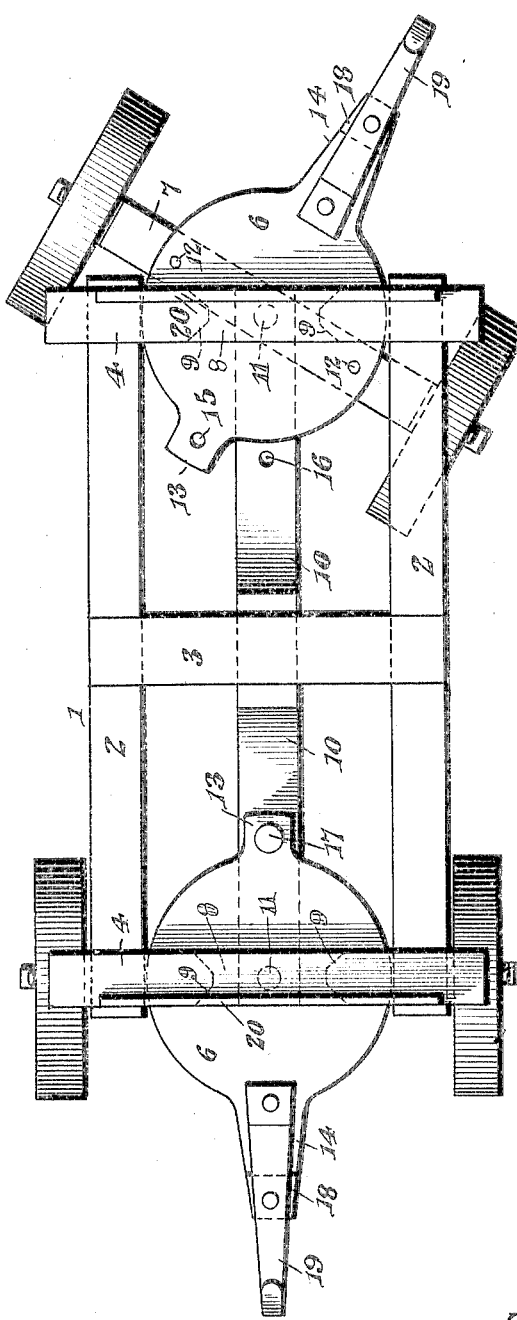
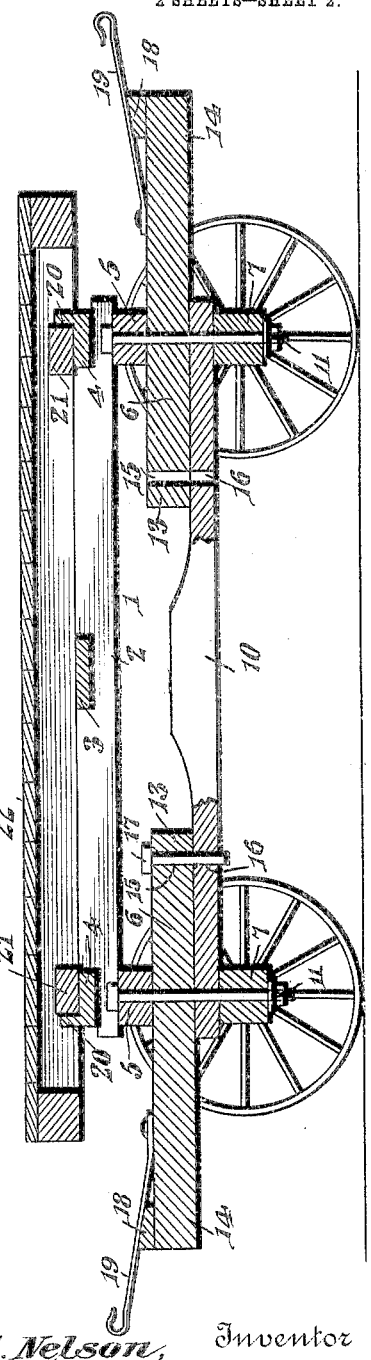
T. C. Nelson, Inventor
Witnesses No. 793,799.

Patented July 4, 1905.

UNITED STATES PATENT OFFICE.

TIBERIUS C. NELSON, OF GRIFTON, NORTH CAROLINA.

TRUCK.

SPECIFICATION forming part of Letters Patent No. 793,799, dated July 4, 1905.

Application filed September 29, 1904. Serial No. 226,536.

*To all whom it may concern:*

Be it known that I, TIBERIUS C. NELSON, a citizen of the United States, residing at Grifton, in the county of Pitt and State of North Carolina, have invented a new and useful Truck, of which the following is a specification.

The invention relates to improvements in trucks.

The object of the present invention is to improve the construction of trucks and to provide a simple and comparatively inexpensive one of great strength and durability designed for handling crates and various other kinds of freight and merchandise and the like and adapted particularly for use at railway-stations and similar places.

A further object of the invention is to provide a truck of this character which when run onto a narrow platform or the like will not require turning to remove it therefrom and which may be readily arranged to enable either end to be used as the front.

The invention also has for its object to provide a truck having a removable platform capable of being reversed or turned end for end and adapted to be placed in position with either end at the front.

With these and other objects in view the invention consists in the novel construction and arrangement of parts hereinafter fully described, illustrated in the accompanying drawings, and particularly pointed out in the claims hereto appended, it being understood that changes in the form, proportion, and minor details of construction within the scope of the claims may be made without departing from the spirit or sacrificing any of the advantages of the invention.

In the drawings, Figure 1 is a perspective view of a truck constructed in accordance with this invention. Fig. 2 is a plan view. Fig. 3 is a longitudinal sectional view. Fig. 4 is a transverse sectional view. Fig. 5 is a detail perspective view of the platform, the same being inverted to illustrate the arrangement of the cross-bars which interlock with the flanges of the frame of the truck.

Like numerals of reference designate corresponding parts in all the figures of the drawings.

1 designates a truck-frame of approximately oblong form composed of side bars 2 and intermediate and end connecting-bars 3 and 4, located at the center and ends of the frame and secured at their terminals to the side bars, preferably in recesses of the upper faces thereof, the end bars 4 being extended laterally beyond the side bars and overhanging the wheels, as shown in Fig. 1. The frame is provided at its ends with lower transverse bars or bolsters 5, having enlarged intermediate portions projecting beyond the lower faces of the end portions and arranged upon approximately circular plates 6, forming fifth-wheels and secured to the front and rear axles 7.

The front and rear axles, which are constructed in the same manner, are provided at their upper faces with central recesses 8, having oppositely-beveled end walls 9 and receiving the ends of a reach 10, which is secured to the ends of the truck by king-bolts 11, passing through registering perforations of the bolsters, the plates or fifth-wheels, and the axles. The plates which form fifth-wheels are rigidly secured to the axles at opposite sides of the central recesses by vertical bolts 12 and form broad supporting-surfaces for the bolsters of the frame of the truck. Each fifth-wheel is provided with inner and outer arms or extensions 13 and 14, the inner extension 13 being provided with a perforation 15, arranged to register with a perforation 16 of the reach and adapted to receive a bolt or pin 17, which is transferred from one end of the truck to the other and which is adapted to lock either fifth-wheel rigid with the reach, whereby either end of the truck may be used as the front. When one of the fifth-wheels or plates is secured to the reach by the pin or bolt 17, the other is free to turn and will operate as a fifth-wheel. The outwardly-extending portion or arm 14 of the plate or fifth-wheel is provided with a block or piece 18, having a beveled upper face and forming a support for a draft bar or tongue 19, secured to the plate or fifth-wheel and to the block 18 and terminating at its upper or outer end in a hook. This draft bar or tongue is adapted to be grasped for hauling the truck, and it also enables the truck to be conveniently coupled to a vehicle.

The frame of the running-gear of the truck is provided at its ends with upwardly-extending transverse flanges 20, which project above the plane of the upper faces of the side and transverse bars of the said frame and which are adapted to interlock with cross-bars 21 of a platform 22. The flanges 20 terminate short of the ends of the transverse bars to provide intermediate projecting portions and supporting end portions. The platform, which is removable and reversible or changeable end for end, is provided with a marginal frame 22, and the cross-bars 21 connect the side bars of the frame at points equidistant of the ends thereof and lie between the upwardly-extending flanges of the frame of the truck, whereby the platform is securely held against longitudinal and lateral movement. The upwardly-extending flanges fit between the longitudinal side bars of the platform and abut against the same to hold the platform against movement transversely of the frame. The marginal frame 22 of the platform rests upon the supporting end portions of the transverse bars 4 and is engaged by the ends of the projecting portions or flanges 20. The body portion or supporting-surface of the platform is preferably formed by transverse boards or pieces secured to the upper faces of the frame of the platform. By constructing the platform in this manner it is readily replaced on the frame of the truck after being removed therefrom, as either end may be arranged at the front or back.

It will be seen that the truck is exceedingly simple and inexpensive in construction, that it is strong and durable, and that either end may be used as the front. The locking pin or bolt which passes through the inwardly-extending arm or portion of one of the plates or fifth-wheels is adapted to be readily changed from one end of the truck to the other, and the platform may be turned end for end, and either end may be arranged at the front or back of the truck.

What is claimed is—

1. A truck comprising a frame, a pair of axles, plates forming fifth-wheels and secured to and extending in advance and in rear of the axles, a reach, king-bolts connecting the frame, the axles and the reach, and a removable locking device adapted to secure either of the plates to the reach, substantially as described.

2. A truck comprising a frame, axles provided with recesses, a reach having its ends arranged in the said recesses, plates secured to the axles and forming fifth-wheels said plates being arranged over the recesses, and the reach being interposed between the plates and the bottom of the recesses, king-bolts connecting the frame, the axles and the reach, and means for locking either of the plates rigid with the reach, substantially as described.

3. A truck comprising a frame provided at its ends with lower bolsters, axles, plates secured to the axles and extending in advance and in rear of the same and forming fifth-wheels and supporting the bolsters, king-bolts passing through the bolsters, the plates and the axles, a reach connected to the axles by the king-bolts, and means for securing either of the plates rigid with the reach, substantially as described.

4. A truck comprising a frame provided at its lower face with bolsters and having projecting flanges at its upper face, a platform detachably interlocked with the flanges, axles provided with plates adapted to form fifth-wheels and receiving the bolsters, a reach, and king-bolts passing through the bolsters, the plates and the axles, substantially as described.

5. A truck comprising axles, approximately circular plates secured to the axles and having inwardly and outwardly extending arms or portions, the inwardly-extending arms being provided with perforations, and the outwardly-extending arms having draft devices, a reach provided with perforations, a king-bolt passing through the plates and the reach, and a fastening device adapted to be arranged in the perforation of either of the inwardly-extending arms or portions for engaging the adjacent perforation of the reach, substantially as described.

6. A truck comprising a frame, axles, a reach, plates secured to the axles, pivots connecting the parts, means for rigidly securing either of the plates to the reach, blocks mounted on the outer portions of the plates and having inclined upper faces and draft-bars secured to the plates and to the blocks, substantially as described.

7. A truck comprising axles having recesses, approximately circular plates having inwardly and outwardly extending arms or portions and secured to the axles, a reach having its ends arranged in the said recesses, a frame having bolsters arranged on the plates, king-bolts passing through the bolsters, the reach and the axles, and draft-bars mounted on the outwardly-extending arms or portions of the plates, substantially as described.

8. A truck comprising a frame having upwardly-extending flanges, a reversible platform provided with side bars receiving the flanges, said platform being also provided with cross-bars arranged to engage the said flanges, and axles supporting the frame, substantially as described.

9. A truck, comprising a running-gear, a removable platform arranged on the running-gear and having cross-bars and provided with a depending marginal frame having side bars, and means on the running-gear to abut against the said cross-bars and engage the side bars of the platform.

10. A truck, comprising a running-gear provided with projecting transversely-disposed bars, a removable platform arranged on the running-gear and provided on its under side between its ends with cross-bars, said platform being also provided with a frame having side bars, and means on the running-gear fitting between the side bars of the frame of the platform to hold the latter against transverse movement and engaging the said cross-bars for holding the platform against longitudinal movement.

11. A truck, comprising a running-gear provided with projecting portions and having terminal supporting portions located beyond the projecting portions, and a removable platform having a marginal frame arranged on the terminal supporting portions of the running-gear and engaging the ends of the projecting portions of the same, said platform being also provided with cross-bars spaced from the ends of the frame and fitting between and engaging the projecting portions of the running-gear.

In testimony that I claim the foregoing as my own I have hereto affixed my signature in the presence of witnesses.

TIBERIUS C. × NELSON.
his   mark

Witnesses:
D. P. BROOKS,
S. K. JACKSON,
THOS. J. MOORE,
GEO. A. CLARK.